United States Patent
Yang et al.

(10) Patent No.: US 10,579,308 B2
(45) Date of Patent: Mar. 3, 2020

(54) HARDWARE SYSTEM FOR DATA CONVERSION AND STORAGE DEVICE

(71) Applicant: Shenzhen Dapu Microelectronics Co., Ltd, Shenzhen, Guangdong (CN)

(72) Inventors: Ken Qing Yang, Saunderstown, RI (US); Dongyang Li, Guangdong (CN)

(73) Assignee: Shenzhen Dapu Microelectronics Co., Ltd, Shenzhen (CN)

( * ) Notice: Subject to any disclaimer, the term of this patent is extended or adjusted under 35 U.S.C. 154(b) by 76 days.

(21) Appl. No.: 16/033,193

(22) Filed: Jul. 11, 2018

(65) Prior Publication Data
US 2018/0321882 A1 Nov. 8, 2018

Related U.S. Application Data

(63) Continuation of application No. PCT/CN2017/087115, filed on Jun. 5, 2017.

(30) Foreign Application Priority Data

Jan. 11, 2017 (CN) .......................... 2017 1 0018045

(51) Int. Cl.
*G06F 3/06* (2006.01)
*G06F 17/22* (2006.01)
*G06F 11/22* (2006.01)
*G06F 13/16* (2006.01)

(52) U.S. Cl.
CPC .......... *G06F 3/0661* (2013.01); *G06F 3/0604* (2013.01); *G06F 3/0673* (2013.01); *G06F 13/1668* (2013.01); *G06F 17/2264* (2013.01); *G06F 11/22* (2013.01)

(58) Field of Classification Search
None
See application file for complete search history.

(56) References Cited

U.S. PATENT DOCUMENTS

| | | | | |
|---|---|---|---|---|
| 4,803,643 A * | 2/1989 | Hickey | .................... | G06T 11/60 715/203 |
| 5,699,062 A * | 12/1997 | Widmer | ................ | H03M 5/145 341/58 |
| 6,195,708 B1 * | 2/2001 | Sugimoto | ............... | G06F 9/541 719/310 |
| 2003/0035063 A1 * | 2/2003 | Orr | ...................... | H04N 7/0882 348/465 |
| 2003/0196033 A1 * | 10/2003 | Lin | ........................ | G06F 3/0613 711/105 |

(Continued)

*Primary Examiner* — Kaushikkumar M Patel

(57) ABSTRACT

A hardware system for data conversion, comprising: a space searching circuit, for searching space characters in a data stream of original data after receiving an instruction sent by a server to read and write data; a length detecting circuit, for detecting a length of data in the data stream of original data according to two adjacent space characters; a parallel encoding circuit, for converting the original data according to the data format in the instruction according to the length and the data stream of original data and outputting the converted data. The hardware system for data conversion is embedded in a storage device. The entire data conversion process could not only improve the efficiency of data conversion, but also does not occupy the resources of the CPU and DRAM of the server or the MCU of the SSD controller.

18 Claims, 4 Drawing Sheets

(56) References Cited

U.S. PATENT DOCUMENTS

| | | | | |
|---|---|---|---|---|
| 2003/0204584 A1* | 10/2003 | Zeira | ............... | H04L 29/06 |
| | | | | 709/224 |
| 2007/0174516 A1* | 7/2007 | Wang | ............... | G06F 13/385 |
| | | | | 710/62 |
| 2007/0277057 A1* | 11/2007 | Braun | ............... | G06F 11/2273 |
| | | | | 714/44 |
| 2008/0168193 A1* | 7/2008 | Bates | ............... | G06F 3/0607 |
| | | | | 710/36 |
| 2008/0235535 A1* | 9/2008 | Sakai | ............... | B82Y 10/00 |
| | | | | 714/10 |
| 2015/0310087 A1* | 10/2015 | Tidwell | ............... | G06F 16/258 |
| | | | | 713/189 |
| 2018/0018172 A1* | 1/2018 | Rouban | ............... | G06F 9/30025 |

* cited by examiner

HARDWARE SYSTEM FOR DATA CONVERSION AND STORAGE DEVICE

CROSS REFERENCE TO RELATED APPLICATIONS

The present application is a Continuation Application of PCT Application No. PCT/CN2017/087115 filed on Jun. 5, 2017, which claims the benefit of Chinese Patent Application No. 201710018045.5 filed on Jan. 11, 2017. All the above are hereby incorporated by reference.

TECHNICAL FIELD

The present application relates to the technology field of data conversion, and more particularly, to a hardware system for data conversion and storage device.

BACKGROUND

Currently, in the era of mass data, large amounts of data are stored in storage in the form of readable file, such as ASCII code, XML, UNICODE, etc. When processing these data, the traditional method is: the CPU (Central Processing Unit) of server firstly reads the file from storage and writes into memory, then converts the data in memory and converts the ASCII code into a binary number that could be operated. However, the traditional method of data conversion consumes a large amount of resources of CPU and DRAM (Dynamic Random Access Memory), and it takes a lot of processing time. At the same time, the CPU has to frequently perform process switching and interrupt handling in the process of performing data conversion, consuming a lot of time and resources. According to statistics, about 60% of the time of each data processing business will spend on the data conversion, and only 40% of the time is actually used in operation.

Recently, it was proposed to use an embedded processor of SSD (Solid State Drives) controller to perform data conversion by the way of software program. However, running program in the MCU (Microcontroller Unit) of the SSD controller not only consumes a large amount of limited resources of the controller, but also costs much longer time to perform data conversion than running program in the CPU of server, because the processing ability of the MCU is far from being so good as that of the CPU of server.

How to improve the efficiency of data conversion without occupying resources of the CPU and DRAM of the server or resources of the MCU of the SSD controller is a technical problem that we urgently need to solve.

SUMMARY

The embodiments of the present application provide a hardware system for data conversion and storage device. The hardware system is embedded in the storage device, so that the data could be converted at the speed of bus transmission while the server reads data from the storage device, which could improve the efficiency of data conversion without occupying the resources of the CPU and DRAM of the server or the MCU of the SSD controller.

To achieve that, the embodiments of the present application adopt the following technical solutions:

For one aspect, a hardware system for data conversion is provided, and the hardware system comprises:

a space searching circuit, for searching space characters in a data stream of original data after receiving an instruction sent by a server to read and write data;

a length detecting circuit, for detecting a length of data in the data stream of original data according to two adjacent space characters;

a parallel encoding circuit, for converting the original data according to the data format in the instruction according to the length and the data stream of original data and outputting the converted data.

Wherein, the space searching circuit comprises:

a space character register, for storing a preset space character preset by user.

Wherein, the space searching circuit further comprises: a plurality of character comparators, connected to the space character register; and the space searching circuit transmits the data stream of original data according to preset multiple sliding windows, and each sliding window corresponds to a character comparator, and each character comparator simultaneously extracts the preset space character from the space character register and compares the preset space character with a beginning character of the corresponding sliding window, to judge whether the beginning character of each sliding window is the preset space character.

Wherein, the length detecting circuit comprises a low address arbiter, connected to the character comparators, for detecting the length of the data in the data stream of original data according to two adjacent sliding windows whose beginning character is the space character.

Wherein, the low address arbiter is implemented based on a 74LS148 priority encoder chip.

Wherein, the hardware system further comprises: a multi-input RAM of 32 bit or 64 bit, for temporarily storing the converted data output by the parallel encoding circuit.

Wherein, the preset multiple sliding windows are preset eight sliding windows.

Wherein, the width of each sliding window is 8 bit.

Wherein, the space character is a comma, a semicolon, or a space symbol.

For another aspect, a storage device is provided, comprising the hardware system for data conversion described above.

Compared with the prior art, the embodiments of the present application may have the following beneficial effects: the hardware system for data conversion provided by the present application is a hardware system of PIS (Processing In Storage)-Convertor, and the hardware system is embedded in a storage device, and when the server reads and writes data, the hardware system automatically converts the data into the required data format according to the instruction of the server. Accordingly, the data is converted at the speed of bus transmission at the same time as the server reads the data from the storage device. By a space searching circuit, a length detecting circuit and a parallel encoding circuit, the entire process is implemented in a parallel and pipeline manner, which could not only improve the efficiency of data conversion, but also does not occupy the resources of the CPU and DRAM of the server or the resources of the MCU of the SSD controller.

DETAILED DESCRIPTION

In order to make the technical problems solved by the present application, technical solutions adopted and technical effects achieved more clearly, the technical solutions of the embodiments of the present application will be further described in detail with reference to the accompanying drawings. Obviously, the described embodiments are only part of embodiments of the present application, not all of embodiments. All of embodiments obtained by person skilled in the art based on the embodiments of the present application without making creative efforts shall fall into the protection scope of the present application.

Figure 1:
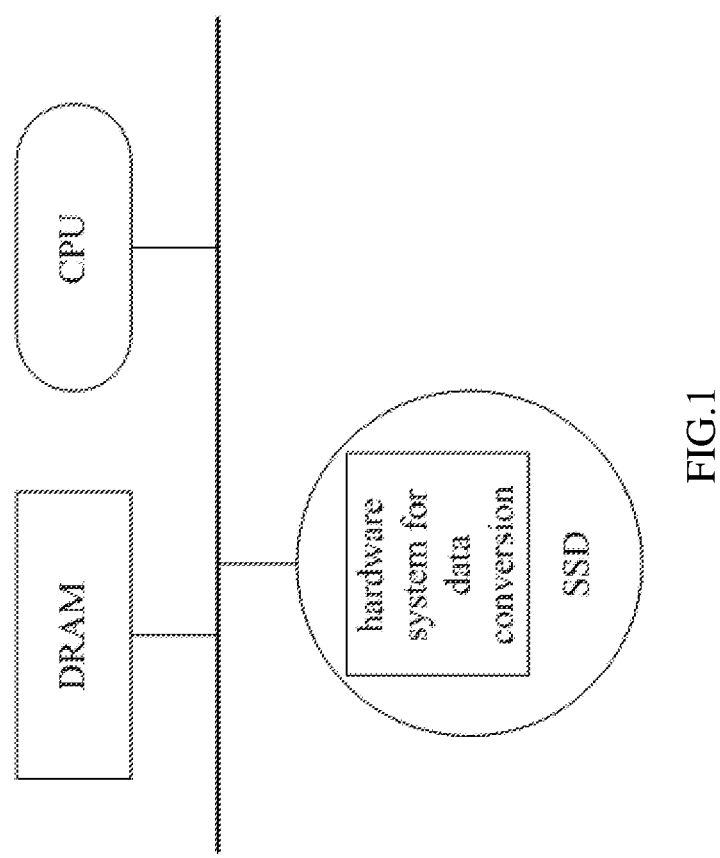
FIG. 1 is an application block diagram of applying a hardware system for data conversion in an SSD according to an embodiment of the present application.
Figure 2:
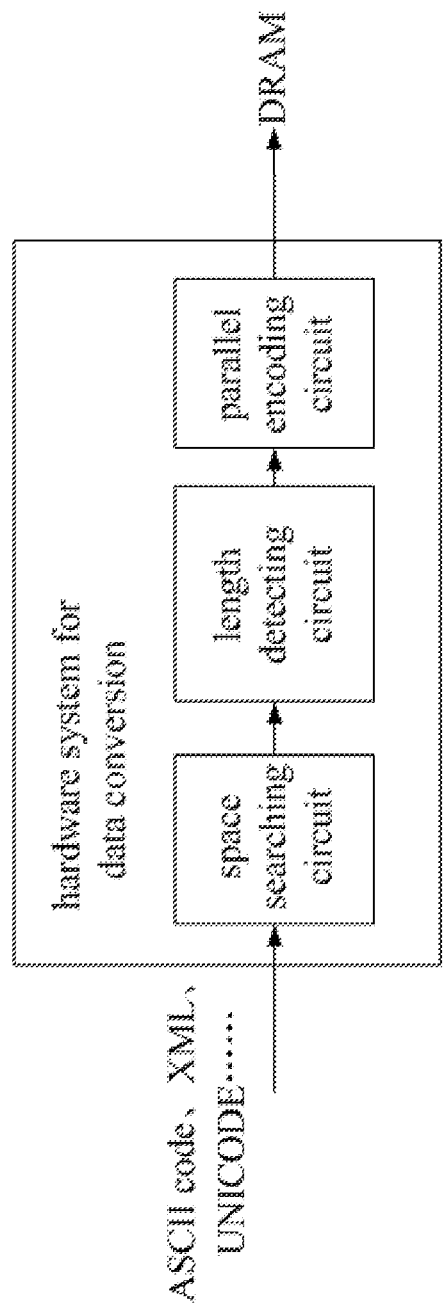
FIG. 2 is a circuit block diagram of a hardware system for data conversion according to an embodiment of the present application.

Please refer to FIG. 1-2. FIG. 1 is an application block diagram of applying a hardware system for data conversion in an SSD according to an embodiment of the present application. FIG. 2 is a circuit block diagram of a hardware system for data conversion according to an embodiment of the present application. An embodiment of the present application provides a hardware system for data conversion. The hardware system comprises:

A hardware system for data conversion comprises:

a space searching circuit, for searching space characters in the data stream of original data after receiving an instruction sent by the server to read and write data;

a length detecting circuit, for detecting a length of data in the data stream of original data according to two adjacent space characters;

a parallel encoding circuit, for converting the original data according to the data format in the instruction according to the length and the data stream of original data and outputting the converted data.

The space searching circuit, the length detecting circuit, and the parallel encoding circuit are connected in order. As an example, if the bus data is "16, ldy, 1024, hello, world, . . . ", the space searching circuit finds the space character "," in the data stream of the bus data; the length detecting circuit determines that the length of data in the data stream of "16, ldy, 1024, hello, world, . . . " is respectively 2, 3, 4, 5, 5 . . . according to the two adjacent space characters ","; the parallel encoding circuit converts the original data according to the data format in the instruction according to the length and the data stream of the original data, for example, the data needs to be converted into a hexadecimal number, and the converted result of data of "16, ldy, 1024, hello, world, . . . " is: 0x00000010, 'ldy', 0x00000400, 'hello', 'world', . . . The DRAM of the server obtains the converted data from the hardware system, and the CPU could directly process the converted data without performing data conversion in the CPU, and the entire conversion process is performed based on the hardware system, which could improve the efficiency of data conversion, without occupying the resources of the CPU and DRAM of the server or the resources of the MCU of the SSD controller.

Preferably, the space searching circuit comprises:

a space character register, for storing a preset space character preset by user. For different data files, the space character may not be the same. Therefore, the user may set the preset space character in advance, and the space character register may store the preset space character preset by the user.

Preferably, the space searching circuit further comprises: a plurality of character comparators, connected to the space character register; the space searching circuit transmits the data stream of original data according to preset multiple sliding windows, and each sliding window corresponds to a character comparator, and each character comparator simultaneously extracts the preset space character from the space character register and compares the preset space character with a beginning character of the corresponding sliding window, to judge whether the beginning character of each sliding window is the preset space character. Multiple sliding windows simultaneously compare whether the beginning character is the preset space character, which is favorable to improve the efficiency of data conversion.

Preferably, the length detecting circuit comprises a low address arbiter, and the low address arbiter is connected to the character comparators, for detecting the length of the data in the data stream of original data according to two adjacent sliding windows whose beginning character is the space character. As a preferred embodiment, the low address arbiter is implemented based on a 74LS148 priority encoder chip or a similar priority encoder chip. The 74LS148 priority encoder chip belongs to prior art and will not be described here. The parallel encoding circuit converts the data according to the length detected by the length detecting circuit, and the parallel encoding circuit comprises a group of adders.

Figure 3:
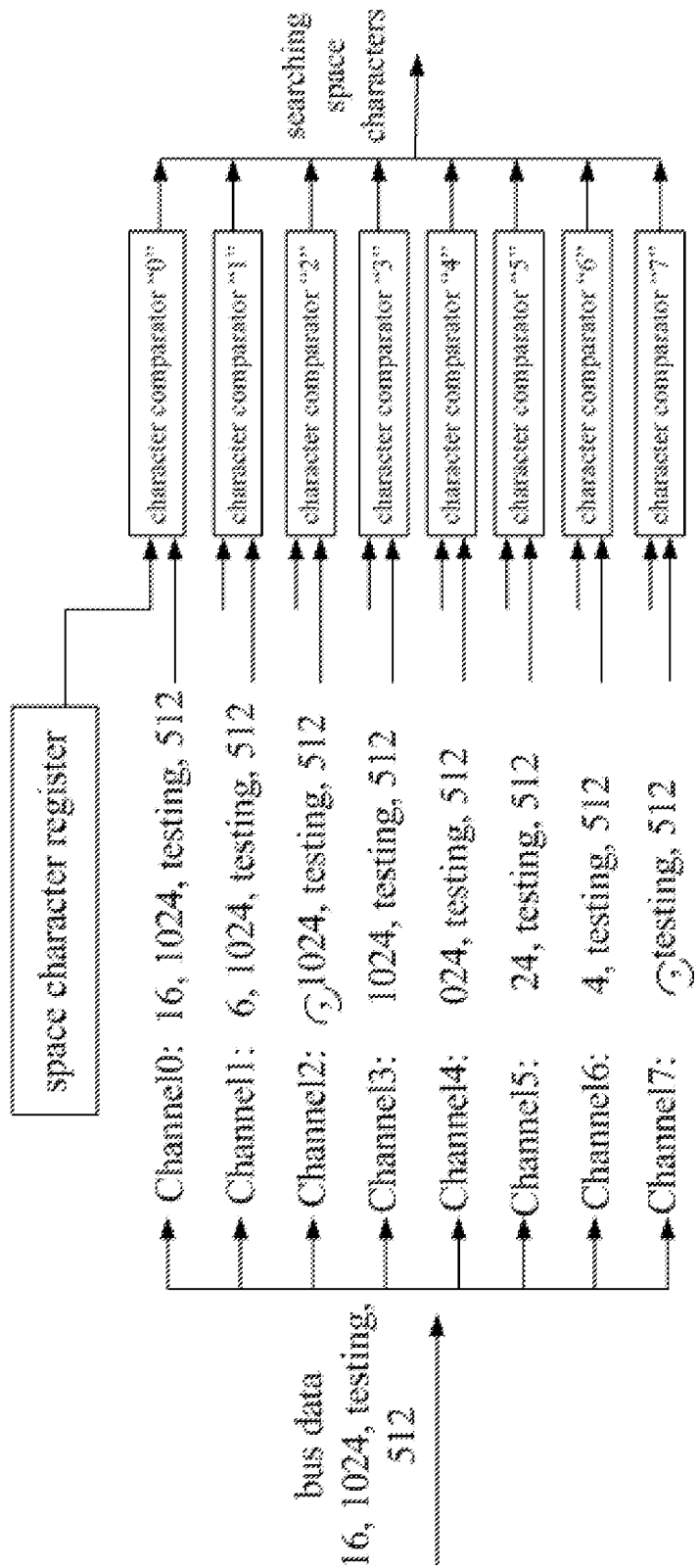
FIG. 3 is a schematic diagram that schematic diagram that a space searching circuit adopts eight sliding windows and simultaneously compares whether the beginning byte of each sliding window is a space character according to an embodiment of the present application.

As a preferred embodiment, the preset multiple sliding windows are preset eight sliding windows, and the preset multiple sliding windows may be more sliding windows except eight sliding windows. The number of preset sliding windows should be based on the number of bytes of I/O bus, such as be equal to the number of bytes of the I/O bus or be multiples of the number of bytes of the I/O bus. The width of each sliding window is 8 bit or 16 bit, 32 bit, 64 bit, or other multiples of 8 bit. As shown in FIG. 3, it is a schematic diagram that a space searching circuit adopts eight sliding windows and simultaneously compares whether the beginning byte of each sliding window is a space character according to an embodiment of the present application. Eight sliding windows (Channel "0~7") respectively correspond to eight character comparators (character comparators "0~7"), and eight character comparators simultaneously compare whether the beginning byte of each sliding window is a space character, which is favorable to improve the comparison rate, so as to improve the efficiency of data conversion. The character comparators "0~7" output the comparison result to the low address arbiter in the length detecting circuit, and the low address arbiter determines the length of the data in the data stream of original data according to the comparison result of each sliding window, for example, the preset space character is ",", and both of the beginning characters of Channel "2" and Channel "7" in FIG. 3 are the preset space character, and there are four sliding windows between Channel "2" and Channel "7", therefore, the length of corresponding data is determined to be four. In the present embodiment, the entire conversion process adopts eight sliding windows to perform parallel conversion, which could real-timely convert data stream with a width of 8 bit. Each sliding window adopts a three-stage pipeline structure comprised by a space searching circuit, a length detecting circuit and a parallel encoding circuit, which could greatly improve the efficiency of data conversion.

Preferably, the space character is a comma, a semicolon, a space symbol or any other space symbol.

Figure 4:
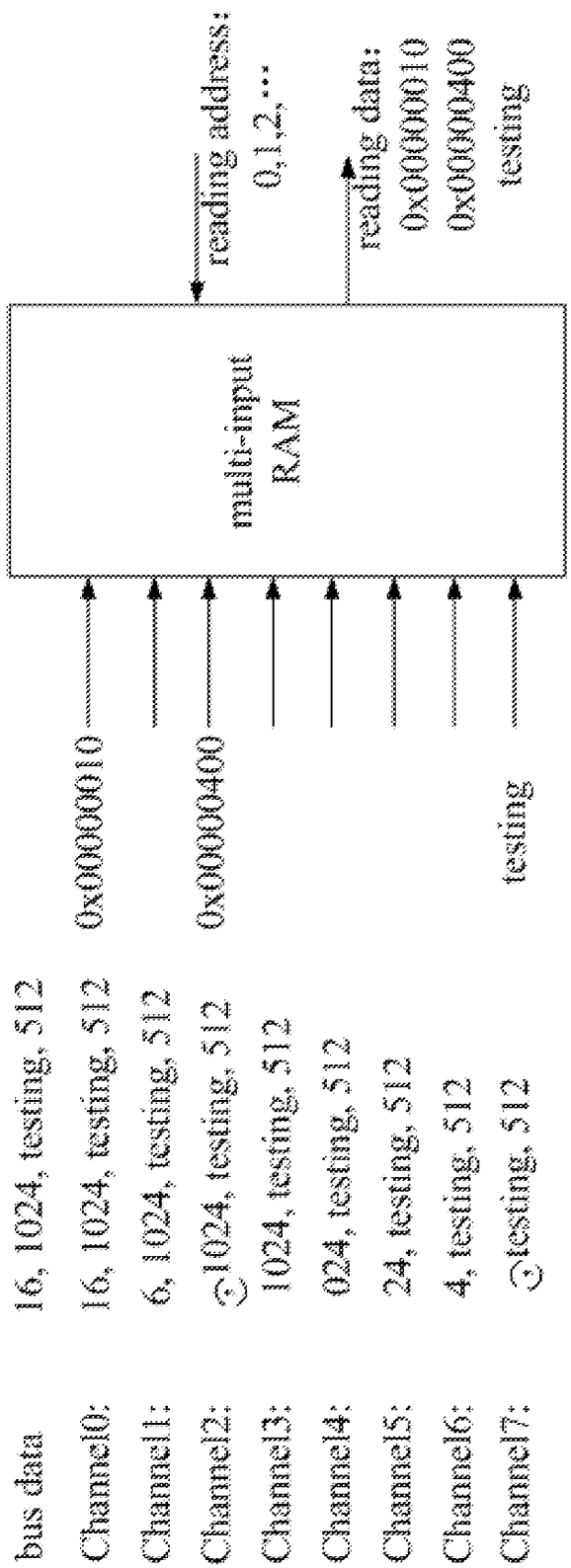
FIG. 4 is a schematic diagram that a multi-input RAM is used to temporarily store the converted data according to an embodiment of the present application.

Wherein, the hardware system further comprises: a multi-input RAM (Random Access Memory, volatile random access memory) of 32 bit or 64 bit or more bit, for temporarily storing the converted data output by the parallel encoding circuit. Since it is possible that there is a plurality of space characters in one sliding window, multi-input RAM of 32 bit is used to temporarily store the converted data, in order to ensure the characteristics of real-time processing data stream. As shown in FIG. 4, it is a schematic diagram that a multi-input RAM is used to temporarily store the converted data according to an embodiment of the present application, and the DRAM of the server could obtain the converted data from the multi-input RAM of 32 bit.

The present application also provides a storage device, comprising a hardware system for data conversion as described above.

In summary, the hardware system for data conversion provided by the present application is a PIS-Convertor hardware system. The hardware system is embedded in a storage device. When the server reads and writes data, the hardware system automatically converts the data into the required data format according to the instruction of server, so that the data is converted at the speed of bus transmission while the server reads data from the storage device. The entire conversion process adopts eight sliding windows to perform parallel conversion, which could real-timely convert data stream with a width of 8 bit. Each sliding window adopts a three-stage pipeline structure comprised by a space searching circuit, a length detecting circuit and a parallel encoding circuit. The entire conversion is implemented in a parallel and pipeline manner, which could not only improve the efficiency of data conversion, but also does not occupy the resources of the CPU and DRAM of the server or the resources of the MCU of the SSD controller.

The technical principle of the present application has been described above with reference to embodiments. These descriptions are only for explaining the principle of the present application, and cannot be interpreted in any way as limiting the protection scope of the present application. The content shown by the drawings is only one of the embodiments of the present application, and the actual structure is not limited thereto. Based on the explanation herein, the person skilled in the art may associate other embodiments of the present application without creative effort, and all of these embodiments should be considered to fall into the protection scope of the present application.

What is claimed is:

1. A hardware system for data conversion, comprising:
a space searching circuit, for searching space characters in a data stream of original data after receiving an instruction sent by a server to read and write data;
a length detecting circuit, for detecting a length of data in the data stream of original data according to two adjacent space characters;
a parallel encoding circuit, for converting the original data according to the data format in the instruction according to the length and the data stream of original data and outputting the converted data.

2. The hardware system for data conversion according to claim 1, wherein the space searching circuit comprises:
a space character register, for storing a preset space character preset by user.

3. The hardware system for data conversion according to claim 2, wherein the space searching circuit further comprises: a plurality of character comparators, connected to the space character register; and the space searching circuit transmits the data stream of original data according to preset multiple sliding windows, and each sliding window corresponds to a character comparator, and each character comparator simultaneously extracts the preset space character from the space character register and compares the preset space character with a beginning character of the corresponding sliding window, to judge whether the beginning character of each sliding window is the preset space character.

4. The hardware system for data conversion according to claim 3, wherein the length detecting circuit comprises a low address arbiter, connected to the character comparators and receiving comparison results output by the character comparators, for detecting the length of the data in the data stream of original data according to two adjacent sliding windows whose beginning character is the space character.

5. The hardware system for data conversion according to claim 4, wherein the low address arbiter is implemented based on a 74LS148 priority encoder chip.

6. The hardware system for data conversion according to claim 1, wherein the hardware system further comprises: a multi-input RAM of 32 bit or 64 bit, for temporarily storing the converted data output by the parallel encoding circuit.

7. The hardware system for data conversion according to claim 3, wherein the preset multiple sliding windows are preset eight sliding windows.

8. The hardware system for data conversion according to claim 7, wherein the width of each sliding window is 8 bit.

9. The hardware system for data conversion according to claim 1, wherein the space character is a comma, a semicolon, or a space symbol.

10. A storage device, comprising the hardware system for data conversion according to claim 1.

11. A storage device, comprising the hardware system for data conversion according to claim 2.

12. A storage device, comprising the hardware system for data conversion according to claim 3.

13. A storage device, comprising the hardware system for data conversion according to claim 4.

14. A storage device, comprising the hardware system for data conversion according to claim 5.

15. A storage device, comprising the hardware system for data conversion according to claim 6.

16. A storage device, comprising the hardware system for data conversion according to claim 7.

17. A storage device, comprising the hardware system for data conversion according to claim 8.

18. A storage device, comprising the hardware system for data conversion according to claim 9.

* * * * *